United States Patent [19]

Peck

[11] Patent Number: 5,790,619
[45] Date of Patent: Aug. 4, 1998

[54] DRAIN SYSTEM FOR A NUCLEAR POWER PLANT

[75] Inventor: Daniel A. Peck, South Windsor, Conn.

[73] Assignee: Combustion Engineering, Inc., Windsor, Conn.

[21] Appl. No.: 783,978

[22] Filed: Jan. 15, 1997

[51] Int. Cl.⁶ .................................................. G21C 9/00
[52] U.S. Cl. ........................ 376/299; 376/352; 376/399; 138/39
[58] Field of Search ............................. 376/298, 299, 376/352, 356, 357, 394; 138/39; 137/561 R, 590, 592, 561 A, 207, 208

[56] References Cited

U.S. PATENT DOCUMENTS

| | | | |
|---|---|---|---|
| 2,654,351 | 10/1953 | Ammon | 122/459 |
| 4,442,858 | 4/1984 | Everett | 137/590 X |
| 4,830,815 | 5/1989 | Gluntz | 376/299 |
| 5,049,353 | 9/1991 | Conway et al. | 376/299 X |
| 5,181,537 | 1/1993 | Powers | 137/561 A |
| 5,271,753 | 12/1993 | Akei et al. | 55/436 |

*Primary Examiner*—Charles T. Jordan
*Assistant Examiner*—Matthew J. Lattig
*Attorney, Agent, or Firm*—John H. Mulholland

[57] ABSTRACT

A drain system for a shutdown cooling system of a pressurized water reactor type of a nuclear power plant (10) has an increased flow rate in the drain pipe (28) and drain pump (33). The hot leg (18) connected drain pipe has a vaned vortex breaker (30) mounted therein between its connection with the hot leg (18) lower region and the drain pump (33). This minimizes vortex-created cavitation in the drain pump thereby permitting the increased flow rate.

1 Claim, 1 Drawing Sheet

DRAIN SYSTEM FOR A NUCLEAR POWER PLANT

FIELD OF THE INVENTION

The present invention is directed to an efficient drain system for a shutdown cooling system of a pressurized water type of nuclear power plant. Specifically, the present invention minimizes coriolis effect vortex-created cavitation in a shutdown cooling system drain pump and thereby permits increased flow rate in the drain.

BACKGROUND OF THE INVENTION

In a nuclear plant of the pressurized water reactor (PWR) type, coolant fluid, which is basically boron and water, is continuously transferred through a closed circulation loop between a nuclear reactor and one or more steam generators.

During power production, the pressurized coolant absorbs heat released by the thermonuclear reaction occurring in the reactor. The heated coolant then flows through a main pipe which is appropriately known as the "hot leg" of the circulation loop. The hot leg delivers the hot coolant to a steam generator.

In the steam generator the coolant fluid circulates through a heat exchanger. The heat exchanger cools the coolant fluid and uses the heat removed from the coolant to produce steam. This steam is eventually used to drive turbines and generate electricity.

After the circulating coolant is cooled by a heat exchanger, a circulation pump removes the coolant from the steam generator via a "suction leg" and returns it to the reactor via a "cold leg" and inlet. The coolant is then reheated in the reactor and the cycle repeats.

This circulation of coolant through one or more loops is critical for the operation of the power plant. Not only does it deliver heat energy to the steam generators where the energy is used to produce steam for driving the turbines, but the circulating coolant also prevents the reactor core in the reactor from over-heating.

Nuclear power plant systems, including the steam generators, require periodic maintenance. In particular, the fluid circulation system must be inspected for potential degradation and nozzle dams must be installed and removed from the steam generators to allow inspection and maintenance to be performed in a dry environment.

In order to install and remove nozzle dams, the coolant fluid must be drained from the steam generator. This requires lowering the fluid level in the main circulation loop and consequently the hot leg or main pipe. During such a maintenance period, which is termed a "shutdown", the coolant continues to be heated by decay heat from the reactor core but it is cooled by an alternate heat exchanger and auxiliary circulatory system known as the "shutdown cooling system".

In order to lower the coolant or water level in the shutdown reactor system to allow maintenance operations on portions of the system above the lowered water level, the water level must be controlled and maintained at a minimum level and flow rate to continuously provide adequate core cooling. This minimum level is about midway within the reactor coolant system main loop piping (the hot leg) and is commonly referred to as "midloop".

During midloop operation, coolant water is circulated through the system to cool the core. Typically, there is a drain line or lines which communicate with the lower region of one or more of the main loop pipes or legs to draw the heated water from the core for cooling by the alternate heat exchanger in the shutdown cooling system and subsequent recirculation of cooled water to a reactor inlet and thus to the core.

During midloop operation, it is possible to experience the formation of a coriolis effect vortex in the drain line if the water level is lowered too far down or if the drain flow rate is too high. Such a vortex is undesirable because it limits the rate at which coolant flow can be drained from the system and it can eventually lead to cavitation in the drain pump. Both results cause concern for continued cooling of the core.

The current methods to avoid vortex formation attempt to keep the water level as high as possible and/or reduce the flow rate, resulting in a conflict between the need to lower the water level for maintenance service, and the need to keep the water level high and at a sufficient rate for safe core cooling.

SUMMARY OF THE INVENTION

The invention is for a shutdown cooling system of a nuclear power plant in which a main pipe or hot leg lower region is provided with a drain and a pump for circulation of a portion of the hot leg flow through an auxiliary heat exchanger and back to an inlet of the reactor. Provision for by-passing the heat exchanger for draining water to create an appropriate midloop water level is also provided (not shown). In any event, the drain pump both drains the loop of water to the desired level for maintenance in the steam generator and recirculates coolant to the reactor core as part of the shutdown coolant system. Accordingly, its efficient performance is mandatory.

Pump cavitation caused by a coriolis effect vortex in the hot leg drain pipe robs efficiency by lowering the flow rate of the drain pipe and slowing down the process of achieving the desired midloop level. Also, pump cavitation threatens the pump's ability to adequately recirculate the shutdown cooling fluid through the system, including the auxiliary heat exchanger which is an important safety part thereof.

It has been found that by placing a vaned vortex breaker in the drain lower region of the substantially horizontally main pipe or hot leg between the reactor and a steam generator, cavitation in the drain pump can be minimized or eliminated, thus increasing drain pipe flow. The vanes are preferably wholly within the drain pipe so as not to unduly interfere with normal hot leg flow.

DETAILED DESCRIPTION OF THE PREFERRED EMBODIMENT

Figure 1:
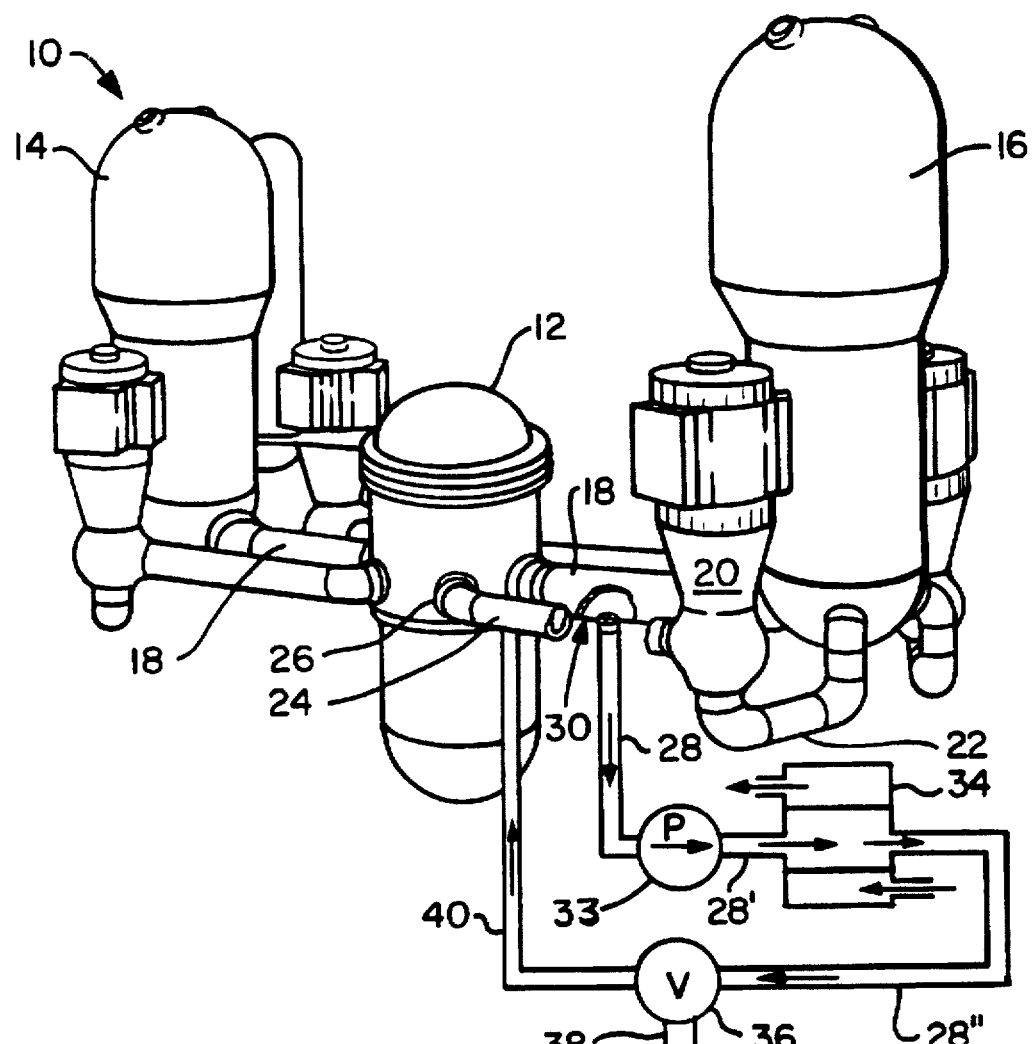
FIG. 1 is an isometric schematic drawing of a nuclear power plant having two steam generators with a shutdown cooling system and drain system utilizing the invention illustrated in connection with only one of the steam generators, for clarity.
Figure 2:
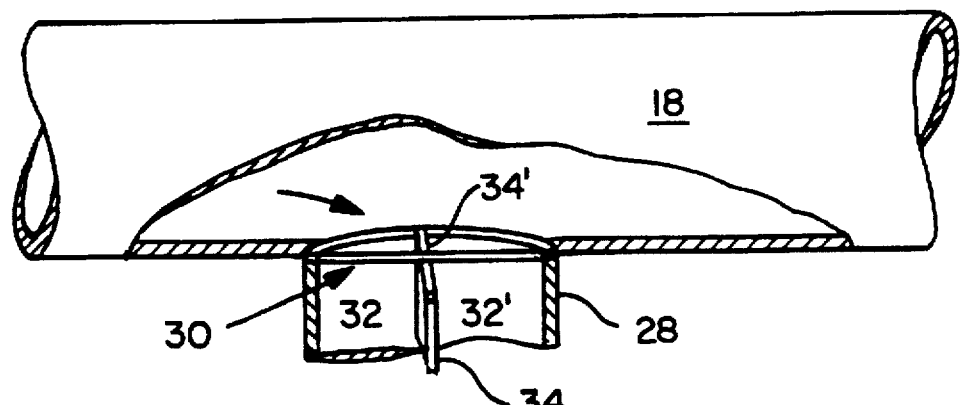
FIG. 2 is an enlarged, fragmented portion of the hot leg and drain pipe of FIG. 1 containing the vortex breaker of the drain system of the invention.

FIG. 1 illustrates a nuclear power plant incorporating the present invention. The numeral 10 generally designates a pressurized water reactor type of plant in which water is continuously transferred through a closed circulation loop between a reactor 12 and each of two steam generators 14 and 16, respectively.

The water coolant from reactor 12 flows through main pipes or hot legs 18 to the respective steam generators 14 and 16, each of which has similar piping.

In the case of steam generator 16, for illustration, a coolant system circulation pump 20 circulates water, which has been cooled in the steam generator, through a suction leg pipe 22, and back to the reactor 12 via cold leg 24 and inlet 26.

The shutdown cooling system drain pipe 28 intersects the lower region of the substantially horizontal main pipe or hot leg 18. Immediately adjacent to, but not within the lower region of the main pipe 18 is a vortex breaker 30 having multiple vanes 32, 32' and 34, 34' mounted within the drain pipe 28.

Flow from the main pipe 18 into the drain pipe 28 is restrained from forming a vortex which could create cavitation in drain mechanical pump 33 which has direct fluid communication from main pipe 18 where it intersects with the lower region of main pipe 18. This vortex breaking action permits increased flow rate in the drain pipe 28 and drain mechanical pump 33. The drain mechanical pump 33 discharges through conduit 28' to auxiliary heat exchanger 34 downstream from it for performance of the shutdown cooling system water cooling function.

From heat exchanger 34 the water is directed by valve 36 in drain pipe section 28" to a drain 38 or to a section of pipe 40 which is connected to the main pipe cold leg 24 for recirculation through reactor 12 inlet 26 to cool the core during the shutdown period or in an emergency when the auxiliary heat exchanger's capacity is needed for safety reasons.

Thus, it will be seen that the present invention provides a drain system and shutdown cooling system for a nuclear power plant of increased efficiency and safety.

I claim:

1. A drain system including a mechanical pump for a reactor shutdown cooling system of a nuclear power plant comprising:

a main pipe to conduct coolant from a nuclear reactor to a steam generator said main pipe being substantially horizontal and having an upper region and a lower region;

a drain pipe connected at the lower region of the main pipe to conduct coolant from the lower region to a drain pump;

a vortex breaker mounted in the drain pipe immediately adjacent to, but not within, the lower region of the main pipe between the lower region of the main pipe and the drain pump to minimize vortex-created cavitation in the drain pump and thereby permit increased flow rate in the drain pipe and drain pump for discharge from the puma through a conduit to a shutdown cooling system heat exchanger having a Primary side and a secondary side.

* * * * *